June 26, 1962  W. C. YOCUM  3,041,038
FIRE EXTINGUISHER VALVE

Filed March 27, 1958  2 Sheets-Sheet 1

INVENTOR.
WILLIAM C. YOCUM.
BY
*Christy, Parmelee & Strickland*
ATTORNEYS.

June 26, 1962     W. C. YOCUM     3,041,038
FIRE EXTINGUISHER VALVE

Filed March 27, 1958     2 Sheets-Sheet 2

INVENTOR.
WILLIAM C. YOCUM.
BY
ATTORNEYS.

3,041,038
FIRE EXTINGUISHER VALVE

William C. Yocum, Scott Township, Allegheny County, Pa., assignor to Superior Valve and Fittings Company, Pittsburgh, Pa., a corporation of Pennsylvania
Filed Mar. 27, 1958, Ser. No. 724,292
3 Claims. (Cl. 251—239)

This invention is for a valve of the type used on carbon dioxide portable fire extinguishers, and more particularly for a valve of the type generally known as a "squeeze-grip" valve.

Valves of the type to which the present invention pertains are used on tank fire extinguishers filled with liquid carbon dioxide, and as generally constructed, have a valve body which is threaded and screwed into an opening in the container. There is a handle pivoted to the valve body in such manner that it cannot be raised above a substantially horizontal position, and by this handle the extinguisher may be lifted and carried about. Pivoted on the valve body above the first handle is a second handle which can be grasped along with the first one. It is normally restrained against movement toward the first when the two are grasped and squeezed by a pull pin, but when this pin is removed, it may be squeezed or moved toward the first, and this movement operates a valve member to release gas from the cylinder.

Such valves as now generally constructed have an internal valve assembly of such construction that the valve body must be drilled and internally threaded at a position immediately under the upper handle and must be drilled and internally threaded at a diametrically opposite position through which other parts of the assembly are inserted. Additionally, at the top of the valve body there is an internally threaded opening leading down into the passage through the valve body into which a safety disk unit is screwed. Therefore, to machine the valve body it is necessary that it be centered in a machining chuck in three successive positions. This arrangement also makes access to certain parts of the valve for inspection difficult, since the arrangement is such that the movable upper handle must be removed to afford access to the parts entered in the threaded opening under the handle.

The present invention has for its principal object to provide a valve of this type in which a single internally threaded opening in the valve body replaces the three heretofore required, while a further object is to provide a valve which is otherwise easier to assemble, to inspect, and more trouble-free.

These and other objects and advantages are secured by my invention which may be more fully understood by reference to the accompanying drawings, in which.

Figure 2:
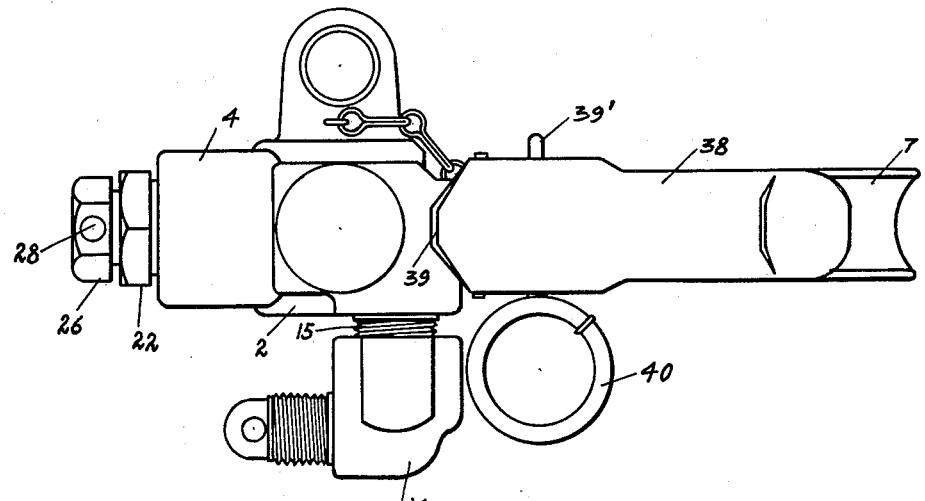
FIG. 2 is a top plan view of the valve.

Referring to the drawings, the valve body is designated generally as 2. It has a longer end 3 which is externally threaded so that it may be screwed into the top of the container. Near the top of the body there is an integral lateral projection 4 that is internally threaded. Diametrically opposite this projection is a second projection 5. Below this projection and above the threaded lower end is a lug 6. A pressed metal handle 7 has an end portion 7' fitted over the lug 6 and pivotally attached thereto by a pivot pin 8. Part 7' of the handle extending over the lug abuts against the valve body when the handle is raised to limit the upward movement of the handle so that the handle may be used to lift and carry the fire extinguisher into which the valve body is screwed, as will be well understood by those familiar with equipment of this kind.

There is a vertical passageway 9 in the valve body extending axially from the lower end up to the level of the extensions 4 and 5. There is a transverse passage extending through the body from the extension 4, the body itself and the extension 5. This passage diminishes in area in progressively smaller steps from the left toward the right as viewed in FIG. 1, and the passage 9 at its upper end opens into and terminates at this cross passage. It is because of the through arrangement of the transverse passage in progressively smaller steps that the assembly of the valve elements in the body from the larger end of the passage as hereinafter described, is possible.

Figure 1:
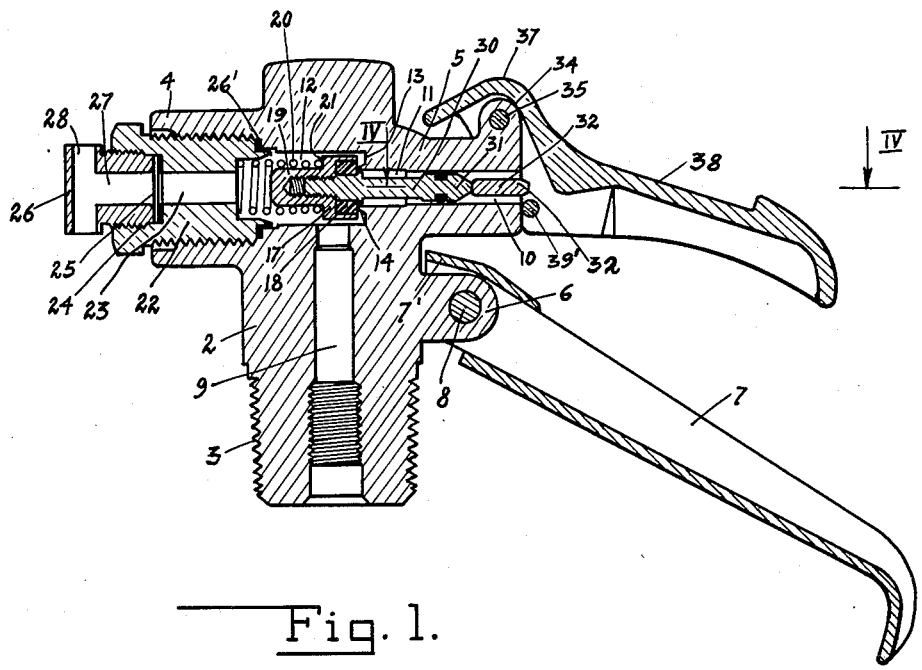
FIG. 1 is a vertical section through a valve embodying my invention.
Figure 3:
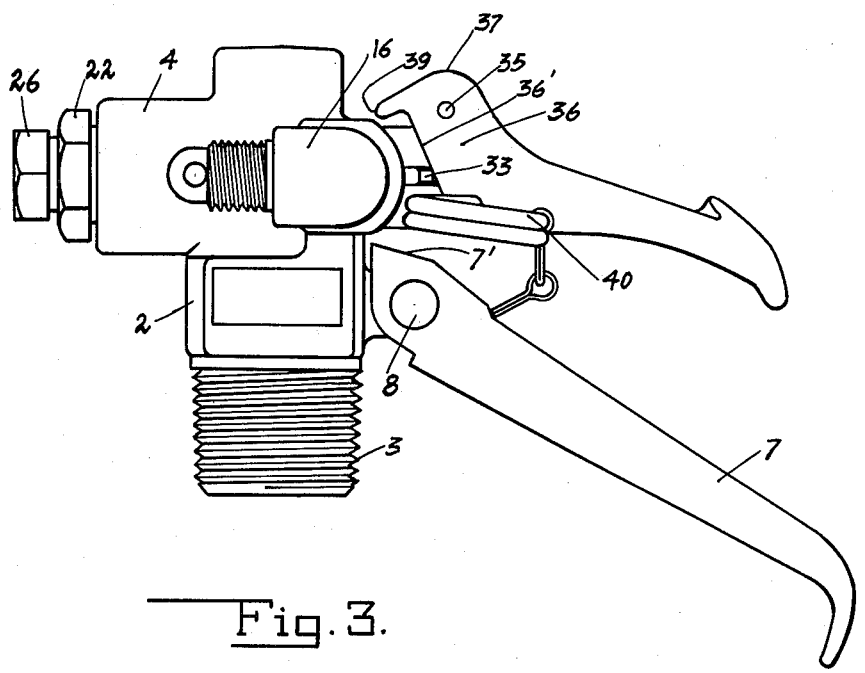
FIG. 3 is a side elevation thereof.

The right end of the transverse passage as viewed in FIG. 1 is of smallest area. This part of the passage is designated 10, and it extends from the end of extension 5 in toward the valve body. It merges into portion 11 which is only of slightly greater diameter, and which extends into the central area of the main valve body. At the inner end of the section 11 of the transverse passage, the passage again enlarges, this enlarged intermediate section 12 being entirely within the valve body. There is a shoulder 13 where the passage 11 opens into the passage area 12, and there is an annular projecting bead or valve seat 14 on this shoulder concentric about the end of passage section 11.

Passage section 12 leads into the interior of the extension 4, the interior of this extension being of greater diameter than the passage section 12. As is customary in valves of this kind, the valve body has a nipple 15 protruding from one side thereof, and this nipple has a passageway through it (not shown) opening into the section 11 of the transverse passage, so that the flow of gas is up the central passage 9, into the section 12 of the horizontal passage into section 11 of the passage and then out through the nipple 15. I have shown an elbow 16 on this nipple.

The valve parts comprise a main valve member 17 with a recessed face in which is a plastic seating composition 18 that is in confronting relation to the valve seat 14. It has a reduced extension 19 around which is a compression spring 20, the inner end of which bears against shoulder 21 on the valve member 17. The other end of the spring 20 is confined against the end of a plug 22 screwed into the internal threads of extension 4. This plug has an axial opening 23 therethrough and a recess at its outer end 24 to receive safety blow-out disk 25, there being a sealing washer in the end of the recess. A second plug 26 holds the disk 25 sealed into the recess, this plug having a central gas escape passage 27 and radial passages 28 to the periphery of the plug.

Extending axially to the right from the main valve member 17 as viewed in FIG. 1 there is a stem 30 which is screwed into the member 17 and which extends through portion 11 of the horizontal passage. It has an integral enlarged terminal 31 which has a sliding fit in the portion 10 of the horizontal passage, and this terminal carries an O ring seal 31'.

The extension 5 on the valve body has a horizontal kerf cut into it, and into this kerf is set a flat metal plate 32 with ears 33 (see FIG. 4) that extend from each side of the kerf. The forward edge of this plate rests against the tip of the terminal 31, so that by moving the plate 32 to the left as viewed in FIGS. 1 and 4, the valve stem may be pressed inward to unseat the valve 17 from the seat 14, this movement being normally resisted by the spring 20 and the gas pressure in the valve.

Figure 4:
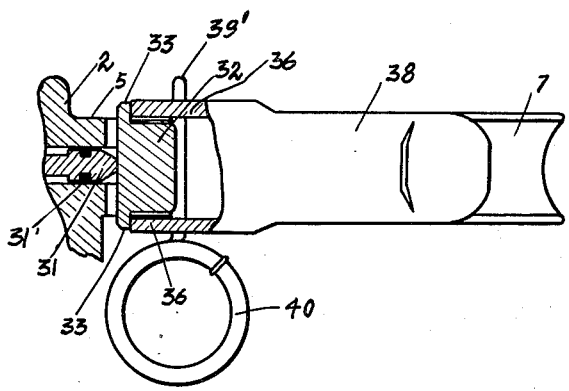
FIG. 4 is a fragmentary horizontal section in the plane of line IV—IV of FIG. 1.

On the top of the extensions 5 is a lug 34 through which passes a pivot pin 35. This pin passes through the downwardly-turned sides 36 of a hood-like formation 37 at the inner end of a second handle 38. The inner end of this handle has a lip-like extension 39 that contacts the valve body when the handle is lifted to limit its upward range of movement. The edge portions 36' of the sides 36 of the hood extend diagonally across the sides of the extension, bearing against the ears 33 at a location inwardly toward the valve body of the axis of the pivot pin 35, so that when the handle 38 is moved down toward handle 7, plate 32 will be forced inwardly to depress the valve stem and unseat valve 17 in the manner above described. As shown in FIG. 4, the plate 32 is long enough in the direction of its line of movement to extend back between the sides 36 of the handle so that the plate 32 cannot rock sideways or slide out sideways, and it cannot slide out endwise because of the engagement of the ears 33 with the edges of the side plate. In assembling, plate 32 is put into place, then the handle is positioned over the lug 34 and the pin 35 is inserted. Thereafter plate 32 cannot become dislodged or be removed except by removal of the handle. This is ordinarily not necessary because all of the valve parts are accessible for inspection by removal of plug 22.

A release pin 39' passes through the side plates 36 of the handle and contacts the end of the extension 5. This pin has a finger ring 40 at one end so that it can be quickly removed, but so long as it remains in place, the handle 37 cannot be moved down to open the valve.

In machining the valve body the transverse opening can be drilled with a tool or tools entered through the extension 4 and the only threading, other than that at the bottom of the body, is the operation of threading the interior of the extension 4. This simplifies very substantially the chucking and machining of the body. The kerf to receive the plate 32 is easily cut into the extension 5 in a simple operation. The valve parts are all preassembled and the O ring is placed on the terminal 31 and the whole assembly inserted through the open end of the extension 4. The O ring makes a more effective seal than the gland heretofore required for valves of this type as heretofore constructed. After the valve parts have been inserted, the spring is dropped into place, a washer 26' put into place at the inner end of the extension 4, and then the plug already fitted with the safety disk and its retaining plug is screwed into place. The plate 32 is then put into place and the handles are attached.

The operating mechanism including the sliding plate 32 is positive and the pressure is applied effectively by a thrust against the plate in such manner that the valve stem, which is substantially shorter than it is where the valve stem projects beyond the valve body, is operated freely without likelihood of binding.

I claim:

1. A valve for fire extinguishers comprising a body having an elongated vertical axis, said body being threaded at one end, a valve element in the body movable transversely of the vertical axis to open and close the valve, the valve element having an operating stem with an outer end, means in the valve body for urging the valve element in a direction to move the outer end of the stem radially away from the vertical axis to close the valve, an extension on the valve into which said end of the stem projects, said extension being slotted in a plane transverse to the said vertical axis of the body and in the plane of the stem, a cross bar slidably received in the slotted extension for movement toward and away from the said axis of the valve body, said cross bar bearing against the outer end of the valve stem, a lug on the said extension of the valve body projecting in a direction parallel with said vertical axis and away from the threaded end of the body, an operating lever having a hood-like portion fitted over said lug, the hood-like portion having side flanges, a pivot passing through the side flanges and through said lug, the hood with the side flanges of the lever holding the cross bar in position in the slotted projection, the edges of the side flanges of the hood bearing against portions of the ends of the cross bar for exerting pressure thereagainst when the lever is moved in an arc about its pivot toward the threaded end of the body to thereby move the cross bar and force the outer end of the valve stem in a direction toward said vertical axis of the body to open the valve.

2. A valve for fire extinguishers comprising a body having an elongated vertical axis, said body being threaded at one end, a valve element in the body movable transversely of the vertical axis to open and close the valve, the valve element having an operating stem with an outer end, means in the valve body for urging the valve element in a direction to move the outer end of the stem radially away from the vertical axis to close the valve, an extension on the valve into which said end of the stem projects, said extension being slotted in a plane transverse to the said vertical axis of the body and in the plane of the stem, a cross bar slidably received in the slotted extension for movement toward and away from the said axis of the valve body, said cross bar bearing against the outer end of the valve stem, a lug on the said extension of the valve body projecting in a direction parallel with said vertical axis and away from the threaded end of the body, an operating lever having a hood-like portion fitted over said lug, the hood-like portion having side flanges, a pivot passing through the side flanges and through said lug, the hood with the side flanges of the lever holding the cross bar in position in the slotted projection, the cross bar having extensions thereon projecting beyond the slotted extension of the body and contacting the edges of the side flanges of said hood-like portion of the lever, the cross bar also having square ends that bear against the inner faces of said side flanges to retain the cross bar against movement in the direction of its length, the hood portion of the lever having an inclined wall between the side flanges confronting said slotted extension to prevent the cross bar from moving out of the end of the slots in the slotted extension, the side flanges of the hood-like portion which bear against the projections of the cross bar serving to move the cross bar toward the vertical axis of the valve body when the lever is rocked on its pivot toward the threaded end of the valve body.

3. A valve for fire extinguishers comprising a body having an elongated vertical axis, said body being threaded at one end, a valve element in the body movable transversely of the vertical axis to open and close the valve, the valve element having an operating stem with an outer end, means in the valve body for urging the valve element in a direction to move the outer end of the stem radially away from the vertical axis to close the valve, an extension on the valve into which said end of the stem projects, said extension being slotted in a plane transverse to the said vertical axis of the body and in the plane of the stem, a cross bar slidably received in the slotted extension for movement toward and away from the said axis of the valve body, said cross bar bearing against the outer end of the valve stem, a lug on the said extension of the valve body projecting in a direction parallel with said vertical axis and away from the threaded end of the body, an operating lever having a hood-like portion fitted over said lug, the hood-like portion having side flanges, a pivot passing through the side flanges and through said lug, the hood with the side flanges of the lever holding the cross bar in position in the slotted projection, the cross bar having extensions thereon projecting beyond the slotted extension of the body and contacting the edges of the side flanges of said hood-like portion of the lever, the cross bar also having square ends that bear against the inner faces of said side flanges to retain the cross bar against movement in the direction of its length, the hood portion of the lever having an inclined wall between the side flanges confronting said slotted extension to prevent the cross bar from moving out of the end of the slots in the slotted extension, the side flanges of the hood-like portion which bear against the projections of the cross bar serving to move the cross bar toward the vertical axis of the valve body when the lever is rocked on its pivot toward the threaded end of the valve body, the hood having a lip at its top that extends over said lug and which is positioned to contact said slotted extension inwardly of said lug when the lever is rocked on its pivot in a direction away from the threaded end of the valve body.

References Cited in the file of this patent

UNITED STATES PATENTS

| | | |
|---|---|---|
| 2,250,220 | Cloutier | July 22, 1941 |
| 2,564,733 | Sipkin | Aug. 21, 1951 |
| 2,654,396 | Huthsing | Oct. 6, 1953 |
| 2,715,908 | Huthsing | Aug. 23, 1955 |
| 2,909,936 | Huthsing | Oct. 27, 1959 |

FOREIGN PATENTS

| | | |
|---|---|---|
| 519,378 | Canada | Dec. 13, 1955 |